Patented Oct. 25, 1938

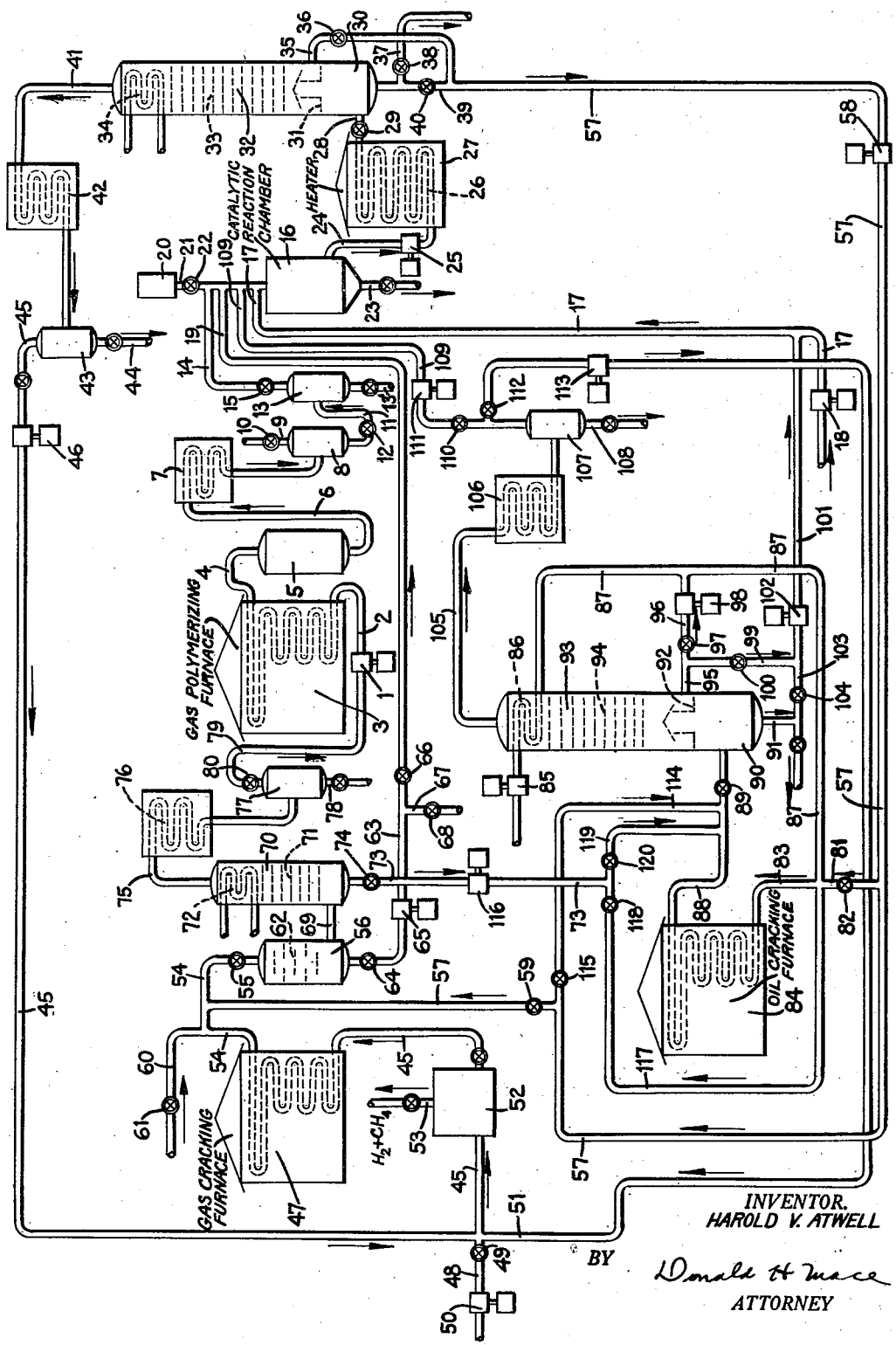

2,134,322

UNITED STATES PATENT OFFICE 2,134,322

TREATMENT OF HYDROCARBONS

Harold V. Atwell, White Plains, N. Y., assignor to Process Management Company, Inc., New York, N. Y., a corporation of Delaware Application October 26, 1934, Serial No. 750,056

5 Claims. (Cl. 196—10)

This invention relates to the treatment of hydrocarbons of petroleum or analogous origin, and more particularly to the conversion of gaseous olefins to normally liquid hydrocarbons.

It has previously been proposed to subject olefinic gases to moderately elevated temperatures and high pressures in order to effect the polymerization of gaseous olefins to normally liquid low-boiling hydrocarbons suitable for use as motor fuel. The usual source of such gases comprises the residual gases produced in processes for cracking hydrocarbon oil. Inasmuch as in the oil cracking art the tendency is to go toward more drastic cracking conditions and higher temperatures, favoring the production of relatively large quantities of gases of relatively high olefin content in order to obtain high yields of cracked distillate of relatively high unsaturation, it becomes increasingly desirable to provide methods for converting as much as possible of the gaseous olefins produced in oil-cracking processes to normally liquid low-boiling products.

My invention therefore has for an object the provision of a process wherein gaseous olefins may be more completely and more advantageously converted into normally liquid low-boiling products than has heretofore been possible, together with such additional operative improvements and advantages as may hereinafter be found to obtain.

The polymerization of gaseous olefins by means of heat and pressure alone, while advantageous from many standpoints, must under ordinary practical conditions fail to achieve as complete a conversion of such olefins as would ultimately be desirable. Consequently, the residual gases from such an operation still contain considerable quantities of gaseous olefins, although the olefin concentration of these residual gases makes them comparatively unsuitable for further treatment in a heat-and-pressure polymerizing operation.

According to my present invention, residual gases from a gas-polymerization operation of the character indicated are subjected to reaction with relatively heavy naphthenic, aromatic or olefinic hydrocarbon oils in the presence of suitable condensing agents such as aluminum chloride in order to effect the production of liquid products which, although they may themselves be unsuitable for use as motor fuel due to their relatively high boiling points, may nevertheless be subjected to conversion either for the purpose of producing motor fuels directly or for the purpose of producing gaseous olefins. As will be made more clear hereinbelow, my invention further contemplates combining gas-polymerizing and catalytic-reaction operations of the character indicated with oil-cracking and gas-cracking operations in a novel and advantageous manner.

In order that my invention may be clearly set forth and understood, I now describe, with reference to the accompanying drawing, various preferred forms and manners in which my invention may be practiced and embodied. In this drawing, the single figure is a more or less diagrammatic, elevational view of apparatus for carrying out my invention in a preferred embodiment.

Referring to the figure, olefinic gases are introduced by means of a pump 1 and a line 2 into a gas-polymerizing furnace 3 wherein the gases are heated to conditions of high pressure and temperature effective to cause the polymerization of gaseous olefins to normally liquid products. While the temperatures and pressures employed may vary considerably as will be appreciated by those skilled in the art, I have found that temperatures of from 700° to 1100° F. and pressures of from 500 to 3000 pounds or more are suitable. In the instance illustrated, the products leaving the furnace 3 are delivered through a transfer line 4 to a soaking zone 5 where they are maintained for a sufficient period of time to carry the polymerization reactions to the desired extent. The products from the soaking vessel 5 then pass through a line 6 to a condenser 7, and the mixture of condensate and residual gas then passes to a high-pressure separator 8.

Fixed gases comprising largely hydrogen and methane are removed from the separator 8 through a vent 9 having a valve 10, while condensate passes through a line 11 having a pressure-reducing valve 12 to a low-pressure separator 13. The gases separated in the separator 13, of relatively high olefinic concentration as compared to the gases withdrawn from the separator 8, pass through a line 14 having a valve 15 to a catalytic reaction chamber 16 while the liquid products of polymerization are removed from the separator 13 through a valved line 13'.

While the use of high-pressure and low-pressure separators makes it possible to achieve a desired separation of hydrogen and methane and to withdraw from the polymerization system a gas relatively rich in olefins, it will be understood that separation of gas and liquids may take place in a single stage if desired.

In the present instance, however, the residual gases from the separator 13, which will ordinarily contain from 10 to 20% of olefinic constituents but which may contain a higher or lower percentage of olefins, depending upon the initial concentration of the gases and the extent of polymerization effected in the furnace 3 and chamber 5, pass as aforesaid to the catalytic reaction chamber 16, where they are commingled with hydrocarbon liquid containing naphthenic, olefinic or aromatic constituents, or a mixture of such constituents, introduced to the chamber 16 through a line 17 having a pump 18. The catalytic reaction chamber 16 may be of any convenient type and may be provided, if desired, with internal baffles for promoting contact of gases and liquids.

The liquid introduced to the chamber 16 may comprise cycle stock or gas oil or tar produced in the cracking of hydrocarbon oil, or may comprise tar produced in the cracking of hydrocarbon gases, a line 19 being provided for admitting the latter to the chamber 16. A suitable condensing agent, such as aluminum chloride or zinc chloride, or a slurry thereof in oil, is also introduced under suitable pressure to the chamber 16 from a source 20 through a line 21 having a valve 22, the introduction of the condensing agent being regulated in accordance with the introduction of the hydrocarbons to be reacted, for example, in the amount of 5 to 10% of the oil charged.

Within the catalytic reaction chamber 16, the olefinic gases and hydrocarbon liquids are caused to react with the condensing agent under suitable conditions, for example at a temperature of from 100° to 500° F. and under a pressure of from atmospheric to 1000 pounds per square inch. Under the influence of the condensing agent, the reaction is vigorous in character and neither high pressures nor long times of contact are ordinarily required.

Sludge containing spent catalyst may be withdrawn from the bottom of the chamber 16 through a valved line 23, while the remaining products pass through a line 24 wherein is located a pump 25 to a heating coil 26 located in a suitable furnace 27. The heat supplied to the products as they pass through the coil 26 may be merely sufficient to effect a vaporization of volatile constituents of these products, for example, by heating the products merely to a temperature below a cracking temperature, such as 700° F., or, where the nature of the products permits, they may be carried to a mild cracking temperature of from 750° to 850° F. in order to secure a mild cracking or so-called "viscosity-breaking" of the products. The heating is ordinarily carried out under a pressure of from 100 to 500 pounds per square inch, so that upon subsequent release of this pressure an adequate separation of volatile and non-volatile constituents may be had.

The heated products then pass through a transfer line 28 having a pressure-reducing valve 29 into an evaporator 30 where, under the influence of pressure reduction and the heat of the products, a vaporization takes place, heavy residual products or tar remaining in liquid form while the lighter and more volatile constituents pass in vapor form through a trap-out tray 31 into a fractionating zone 32 having suitable plates or trays or other fractionating devices 33 and a cooling coil 34. By means of the cooling coil 34, or by means of reflux supplied to the tower 32 in the well-known manner, a partial condensation and fractionation is effected, the temperatures of condensation ordinarily being such that the liquid material which condenses and passes downward through the fractionating column 32 and is withdrawn from the trap-out tray 31 constitutes volatile distillate heavier than gasoline, that is to say, a condensate of the general nature of gas oil, which is withdrawn from the tray 31 through a line 35 having a valve 36.

The heavy residual material which separates in the evaporator 30 may be withdrawn from the latter through a line 37 having valve 38, or by means of a line 39 having a valve 40 to be combined with the condensate withdrawn through the line 35.

Overhead vapors from the fractionating tower 32 pass through a conduit 41 to a condenser 42 and a separator 43, from which any light condensate of the nature of gasoline may be withdrawn through a valved line 44 while residual gases comprising mainly paraffins are withdrawn from the separator 43 through a line 45.

In the preferred instance, the condensate withdrawn through the line 35, together, if desired, with all or a part of the residue or tar withdrawn from the evaporator 30, is subjected to conversion or cracking by introducing it into a stream of highly heated gases issuing from a furnace in which paraffinic gases are subjected to high temperatures to effect their conversion into gaseous olefins.

Thus, the residual gases from the separator 43 may pass through the line 45 wherein is located a pump or compressor 46 to a gas-cracking furnace 47. In the preferred instance the gas-cracking furnace 47 is additionally supplied with paraffinic gases either from some outside source through a line 48 having a valve 49 and a pump 50 or through a line 51 which serves to supply residual gases from an oil-cracking unit to be described more fully hereinbelow. Preferably, the gases passing through the line 45 into the furnace 47 are subjected at 52 to a gas-fractionating operation for the removal of hydrogen and methane.

Inasmuch as gas-fractionating systems for this purpose are known, and since the details of such fractionation do not constitute a part of the present invention, the gas-fractionating stage 52 has been represented diagrammatically in the drawing. As a preferred example of such fractionation, however, I may employ a gas-fractionating stage wherein a suitable absorption medium, such as liquefied butane, is recirculated through an absorption stage and a stripping stage, the residual gases being withdrawn from the absorption stage comprising largely hydrogen and methane, while the gases issuing from the stripping stage contain the higher paraffins and olefins in relatively concentrated form. Hydrogen and methane are withdrawn at 53.

The gases passing through the gas-cracking furnace 47 are therein heated to a high temperature of from 1200° to 1750° F., preferably from 1400° to 1600° F., under a relatively low pressure of from atmospheric to 200 pounds per square inch, in order to effect a conversion of gaseous paraffins to olefins. In the present instance, the highly heated gases issuing from the gas-cracking furnace 47 pass through a transfer line 54 having a valve 55 into a reaction chamber 56, and the temperature of the gases is reduced by means of hydrocarbon oil withdrawn through the lines 35 or 39 or both, which is delivered to the transfer line 54 through a line 57 having a pump 58 and a valve 59. The oil withdrawn through the conduit 35 may be used alone for this purpose or it may be combined with the heavier oil withdrawn through the line 39, as has been indicated hereinabove. Additional oil, preferably a heavy oil, may be introduced to the transfer line 54, if desired, through a line 60 having a valve 61, from any suitable source. In any event, oil is introduced to the transfer line 54 in such quantities as to reduce the temperature of the admixed gases and liquid to from about 900 to about 1100° F. In thus cooling the products from the gas-cracking furnace 47, however, the oil introduced to the line 54 is subjected for a short period of time to temperatures which may run as high as 1400° to 1500° F. and under the influence of such high temperatures as well as the temperatures prevailing in the reaction chamber 56 the oil is subjected to conversion with resultant production of additional quantities of gaseous olefins. The reaction chamber 56 is preferably provided with suitable internal baffles 62 for promoting and prolonging contact between the gases and liquids introduced into the reaction chamber 56.

Tar or residual liquid produced in the cracking of hydrocarbon gas and oil within the reaction chamber 56 is withdrawn from the latter through a line 63 having a valve 64, and is delivered by means of a pump 65 either through the line 19 wherein is located a valve 66 to the reaction chamber 16 or may be withdrawn from the system through a branch line 67 having a valve 68.

Vapors from the reaction chamber 56 pass through a line 69 to a fractionating tower 70 having plates or trays 71 and a cooling coil 72. In the fractionating tower 70 the vapors are fractionated to effect the condensation and separation of distillate heavier than gasoline, i. e. gas oil, this condensate being withdrawn from the bottom of the fractionating tower 70 to a line 73 having a valve 74 while the remaining vapors pass through a vapor line 75 to a condenser 76 and a separator 77. Light condensate or gasoline is withdrawn from the separator 77 through a valved line 78, while the olefinic gases pass through a line 79 having a valve 80 to the pump 1 and line 2 for delivery into the gas-polymerizing furnace 3.

According to an alternative form of my invention, the oil withdrawn from the fractionating tower 32 through the line 35 may be subjected to conversion in a separate oil-cracking installation.

In this instance, the tar withdrawn from the evaporator 30 is preferably removed from the system through the line 37, and the condensate withdrawn through the line 35 is delivered by means of the pump 58, the line 57, a branch line 81 having a valve 82 and a line 83 to an oil-cracking furnace 84. The furnace 84 is also preferably supplied with a suitable charging stock, such as gas oil, which is delivered to the furnace 84 by means of a pump 85 through a heat-exchange coil 86, a line 87 and the line 83. The oil passing through the furnace 84 is heated to a suitable cracking temperature, for example, from 850° to 1050° F., under a suitable pressure of from 50 to 1000 pounds per square inch, and then passes through a transfer line 88 having a pressure-reducing valve 89 into an evaporator 90, from which residual products or tar are withdrawn through a valved line 91, while the separated vapors pass upward through a trap-out tray 92 into a fractionating tower 93 having suitable plates or trays 94, and in the upper portion of which is located the heat-exchange coil 86 or other cooling means.

The fractionating tower 93 is operated to condense hydrocarbon vapors heavier than gasoline, i. e. gas oil, which is withdrawn from the tray 92 through a line 95. A portion of this gas oil may be returned by means of a line 96 having a valve 97 and a pump 98, the line 87 and the line 83 to the furnace 84, thus providing for recycling this material through the oil-cracking zone, while a further portion of this gas oil may pass through a branch line 99 having a valve 100 and a line 101 wherein is located a pump 102, and the line 17, for delivery into the catalytic reaction chamber 16. Tar withdrawn from the evaporator 90 through the line 91 may also be delivered through a line 103 having a valve 104 to the pump 102 and thence to the catalytic reaction chamber 16, or any desired mixture of the gas oil withdrawn at 95, and the tar withdrawn at 91 may be delivered to the reaction chamber 15.

The overhead vapors from the fractionating tower 93 pass through a line 105 to a condenser 106 and to a gas separator 107 from which low-boiling cracked distillate, i. e. gasoline or naphtha, is withdrawn through a valve line 108. Residual gases, according to their relative concentrations of olefins and paraffins, may pass either through a line 109 having a valve 110 and a pump 111 to the catalytic reaction chamber 16, or may be delivered through the line 51, wherein is located a valve 112 and if necessary a pump 113, to the line 45 which supplies the gas cracking furnace 47, preferably first passing through the hydrogen- and methane-separator 52.

Instead of introducing the oil withdrawn through the line 35 to the inlet to the furnace 84, this oil may be delivered by means of the line 57 and a branch conduit 114 having a valve 115 to the transfer line 89, where it serves as a quenching medium for reducing the temperature of the products from the furnace 84. Heavy distillate produced in the gas- and oil-cracking operation conducted at 56 and condensed in 70 may also be delivered by means of the line 73 and a pump 116 either through a branch line 117 having a valve 118 to the line 83 for delivery to the furnace 84, or through a line 119 having a valve 120 to the transfer line 88.

It will be apparent from the above that in my process residual gases from the gas-polymerization operation may be further reacted with hydrocarbon oil and in the presence of a condensing agent to produce liquid reaction products, and such reaction products or a portion thereof may be cracked, either in an oil-cracking operation or in a gas-cracking operation. In one embodiment described hereinabove, hydrocarbon oil may be cracked to produce motor fuel, heavier oil and residual gases, the residual gases being subjected to cracking for the purpose of increasing their olefinic content and then subjected to polymerization for the purpose of converting gaseous olefins to normally liquid products suitable for use as motor fuel while the heavier products of the oil-cracking operation are reacted with the residual gases in the gas-polymerizing operation to produce liquids suitable for further cracking, leaving residual gases which may be further cracked to produce additional gaseous olefins suitable for polymerization.

It will further be apparent to those skilled in the art that, while I have described my invention hereinabove with respect to various preferred examples and operating details, my invention is not limited to such illustrative examples or details, but may variously be embodied and practiced within the scope of the claims hereinafter made.

I claim:

1. The process of producing low-boiling normally liquid hydrocarbon oil from gases containing olefins, which comprises subjecting said gases to elevated temperature and high pressure to effect a polymerization of a substantial portion of said olefins to normally liquid products, removing normally liquid products of polymerization, subjecting remaining gases to reaction in the presence of a catalytic condensing agent with relatively heavy hydrocarbon oil containing residual constituents to effect the formation of normally liquid hydrocarbon oil products of higher boiling-point range than the desired final product, removing said products, subjecting at least a part of them to conversion at a high cracking temperature to produce gaseous olefins and relatively heavy hydrocarbon oil, separating said last-mentioned oil from other products, supplying it, at least in part, for reaction with said remaining gases in the presence of said catalytic condensing agent, and recycling gaseous olefins thus produced for subjection to said elevated temperature and high pressure to effect a further polymerization thereof to low-boiling normally liquid hydrocarbon oil.

2. The process of producing low-boiling normally liquid hydrocarbon oil from hydrocarbon gases containing gaseous paraffins which comprises cracking said gases at high temperature to effect a conversion of gaseous paraffins to gaseous olefins, subjecting resultant olefinic gases to elevated temperature and high pressure to effect a polymerization of a substantial portion of said olefins to normally liquid products, removing normally liquid products of polymerization, subjecting remaining gases to reaction in the presence of a catalytic condensing agent with relatively heavy hydrocarbon oil containing residual constituents to effect the formation of normally liquid hydrocarbon oil products of higher boiling-point range than the desired final product, removing said products, subjecting at least a part of them to contact with the highly heated gases leaving the gas-cracking stage for the production of gaseous olefins and relatively heavy hydrocarbon oil, separating said last-mentioned oil from other products and supplying it, at least in part, for reaction with said remaining gases in the presence of said catalytic condensing agent.

3. The process of producing low-boiling normally liquid hydrocarbon oil from hydrocarbon gases containing gaseous paraffins which comprises cracking said gases at relatively high temperature and under relatively low pressure to effect a conversion of gaseous paraffins to gaseous olefins, subjecting resultant olefinic gases to a relatively low temperature and under a relatively high pressure to effect a polymerization of a substantial portion of said olefins to normally liquid products, removing normally liquid products of polymerization, subjecting remaining gases to reaction in the presence of a catalytic condensing agent with relatively heavy hydrocarbon oil containing residual constituents to effect the formation of normally liquid hydrocarbon oil products of higher boiling-point range than the desired final product, removing said products, subjecting at least a part of them to contact with the highly heated gases leaving the gas-cracking stage for the production of gaseous olefins and relatively heavy hydrocarbon oil, separating said last-mentioned oil from other products, supplying it, at least in part, for reaction with said remaining gases in the presence of said catalytic condensing agent, and returning at least a portion of the residual gases remaining after reaction with said heavy oil to the gas-cracking stage.

4. The process of producing low-boiling normally liquid hydrocarbon oil from hydrocarbon gases containing gaseous paraffins which comprises heating said gases at a temperature of from 1200° to 1750° F. to effect a conversion of gaseous paraffins to gaseous olefins, subjecting resultant olefinic gases to a lower temperature and a pressure in excess of 1000 pounds per square inch to effect a polymerization of a substantial portion of said olefins to normally liquid products, removing normally liquid products of polymerization, subjecting remaining gases to reaction in the presence of a catalytic condensing agent with relatively heavy hydrocarbon oil containing residual constituents to effect the formation of normally liquid hydrocarbon oil products of higher boiling-point range than the desired final product, condensing and removing said products, commingling them with the highly heated gases leaving the gas-cracking stage for the production of gaseous olefins, separating residual products of the commingled oil and gases prior to delivering the olefinic gases to the gas-polymerizing stage, and reacting commingled oil thus separated in the presence of said catalytic condensing agent.

5. In the conversion of hydrocarbons into hydrocarbons within the gasoline boiling range, the improvement which comprises reacting normally gaseous hydrocarbons and normally liquid hydrocarbons in the presence of a catalytic condensing agent to effect formation of normally liquid hydrocarbons of higher boiling range than gasoline, independently subjecting thus-obtained normally liquid hydrocarbons of higher boiling range than gasoline to conversion into gasoline, heavier hydrocarbons, and normally gaseous hydrocarbons, subjecting normally gaseous hydrocarbons thus obtained to polymerization to obtain liquid polymers and unconverted gases, and supplying unconverted gases resulting from said polymerization to said reaction stage in the presence of said condensing agent.

HAROLD V. ATWELL.